March 13, 1934.    P. C. GIANINI    1,950,882
BRAKE ROD CUSHIONING DEVICE
Filed July 22, 1930
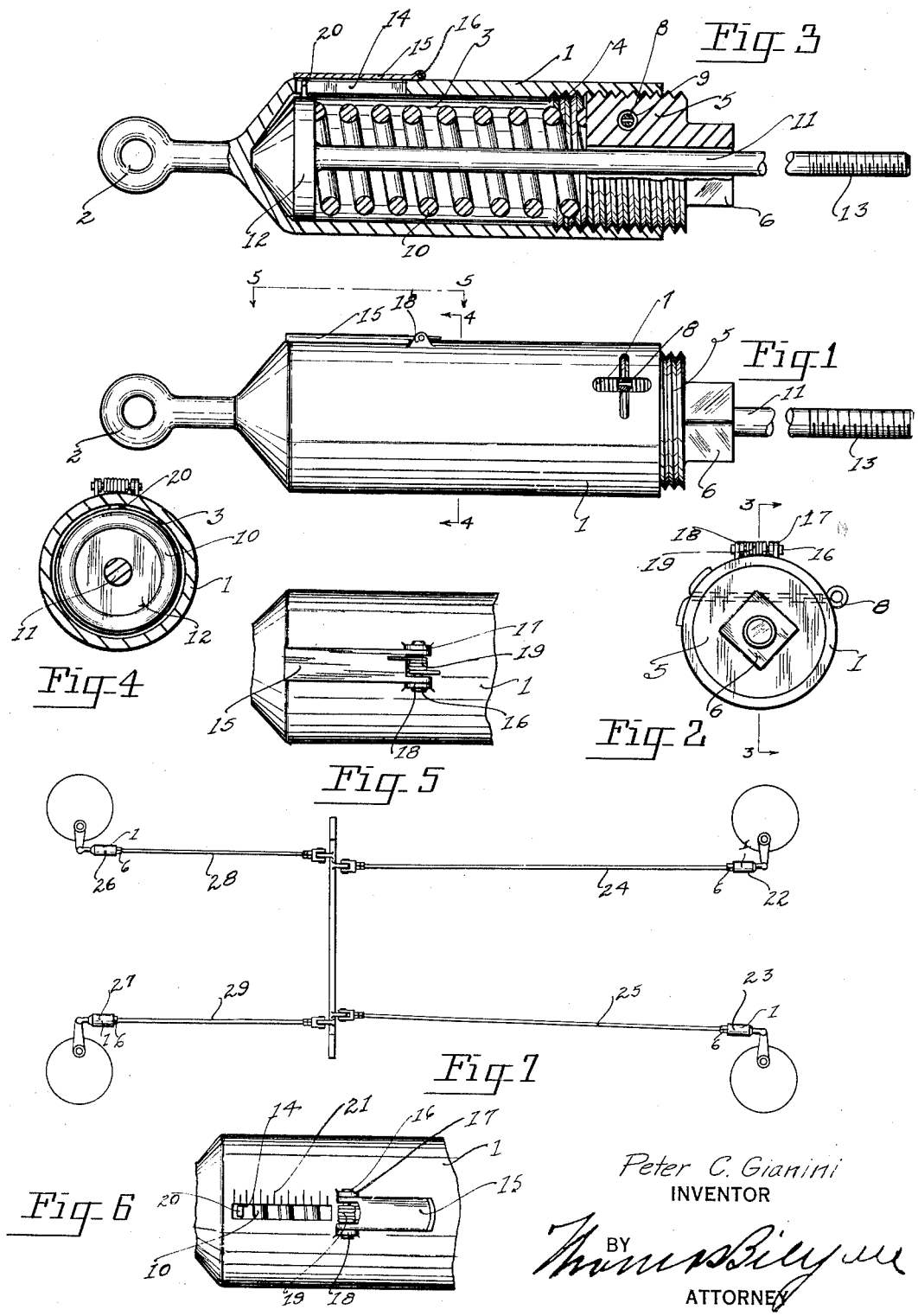
Peter C. Gianini
INVENTOR
BY
ATTORNEY Patented Mar. 13, 1934

1,950,882

UNITED STATES PATENT OFFICE 1,950,882

BRAKE ROD CUSHIONING DEVICE

Peter C. Gianini, Portland, Oreg.

Application July 22, 1930, Serial No. 469,679

2 Claims. (Cl. 265—63)

The object and purpose of my invention is to provide a brake rod that is equalizing in its effect and that will apply the braking pressure in a resilient manner to thereby prevent the chattering of the brakes and that will prevent the application of unequal braking pressure to the wheels.

The invention consists, primarily of a barrel, having an eye disposed at one end through which a bolt, or pin, may be made to pass to place the same within the brake rod having a removable head threadedly disposed in the oppositely disposed end through which a threaded stem is made to pass with a spring disposed within the barrel, with the stem having a head formed thereupon to engage the spring and to form a resiliency between the engaging elements. A slot is formed within the barrel having a closure therefor that may be turned about a supporting pin in order that the mechanic adjusting the same may observe the braking action upon the rod, and the pressure developed therein by a pointer secured to the stem head. The pointer is placed within the slot and the action of the pointer may be observed when braking pressure is applied. After the journal head is threadedly positioned within the body element, a supporting key may be placed therein to prevent the premature dislodgment of the head from the body element.

The purpose and object of my invention is to provide a unit placeable within the brake rod line that will be equalizing in its effect to thereby prevent all of the braking pressure being applied to one of the brake bands only.

A further object of my invention consists in providing an assembly structure, that is compact and that may be assembled and a known pressure be developed when calibrated springs are used, to thereby develop an equal pull upon each of the brake bands when braking pressure is applied.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a side view of the assembled device.

Fig. 2 is an end view of the mechanism illustrated in Fig. 1.

Fig 3 is a longitudinal, sectional, side view of the assembled device, the same being taken on line 3—3 of Fig. 2, looking in the direction indicated.

Fig. 4 is a sectional, end view of the assembled device, the same being taken on line 4—4 of Fig. 1, looking in the direction indicated.

Fig. 5 is a fragmentary, sectional, plan view of the body element and of the closure disposed about a slot extending through the side wall of the body element. The view is taken on line 5—5 of Fig. 1, looking in the direction indicated.

Fig. 6 is a side view of the mechanism illustrated in Fig. 5 and illustrating the closure as being in opened condition.

Fig. 7 is a top, plan view of a pair of brake rods and equalizer bars shown in position and illustrating one of my equalizers in place and in position upon each of the brake rods.

Like reference characters refer to like parts throughout the several views.

I preferably form the body 1, of my device, of a single piece having an eye 2 rearwardly extending from the body element through which a shackle pin, or bolt, is made to pass to connect the same with the brake rod. A cylindrical recess 3 forms the major portion of the body element with a thread 4 disposed upon the inner surface of the open end of the body element.

A journal head 5 is adapted for being threadably secured to the body element with a square, or hexagonal nut 6, formed upon the outer end of the same to facilitate the positioning of the same within the body element. A slit 7 is formed at either side of the body element through which a locking pin 8 is made to pass. The locking pin 8 passes through a hole 9 that extends through the journal head. A calibrated spring 10 is disposed within the barrel of the body element. A stem 11 passes through the locking head 5 and has a head 12 disposed upon its inner end. The calibrated spring 10 rests upon one end against the head 12 and upon its oppositely disposed end against the locking head 5.

The stem 11 is preferably threaded upon its outer end as illustrated at 13 to facilitate its attachment, or placement, within the brake rod line. A slit 14 is disposed in one side of the barrel, or body element, and a closure 15 is provided therefor. The closure preferably is supported upon a journal pin 16 that passes through bosses 17 and 18 that outwardly extend from the barrel.

A reacting element, as a spring 19, is disposed about the pin, the purpose and object of which is to maintain the closure in locked position. To facilitate the action of the device when placed in position upon the brakes, a pin 20 is secured to the head 12 and the same is permitted to move within the slit 14. Graduations 21 are provided at one side of the slit to enable the adjuster to tension the spring 10, so that an equal pull is developed upon each of the brake bands.

I have here shown my units in place upon the brake rods as illustrated in Fig. 7, with a pair of the units 22 and 23 being disposed upon the forward brake rods 24 and 25 and a pair of units 26 and 27 being disposed upon the rear brake rods 28 and 29.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is;

1. A device of the class described, comprising a body element, an eye formed at the base of the body element, a bearing head threadably secured to the body element, a stem extending through and central of the head, means for locking the head relative to the body element, a head formed upon the inner end of the stem, a spring disposed about the stem and between the respective heads, said body element having a slit through the side wall thereof and extending in the direction of its length, a spring closure therefor adapted to retain a lubricant, a pin formed integral with the head and disposed through the slit, and graduations disposed adjacent one side of the slit to indicate the compression of said spring.

2. In a device of the class described, a cylindrical body element having an eye formed integral with one end thereof, a closure head disposed threadably within the opposite end, said closure head having a port disposed longitudinally therethrough, and means for adjusting its position disposed externally of the body element; a piston head slidably disposed within the body element a rod attached to said head slidably disposed within the port in the closure head; means for locking the closure head relative to the body element; an aperture disposed longitudinally of the body element near the eye-bearing end, a graduated scale disposed thereabout; indicating means disposed upon the piston head visible externally and a closure for the last mentioned aperture adapted to maintain a liquid tight joint and to permit vesibility of the indicating means when desired.

PETER C. GIANINI.